United States Patent [19]

Burrage

[11] Patent Number: 4,481,611
[45] Date of Patent: Nov. 6, 1984

[54] SEISMIC CABLE COMPASS SYSTEM

[75] Inventor: Eric C. Burrage, Pearland, Tex.

[73] Assignee: Shell Oil Company, Houston, Tex.

[21] Appl. No.: 270,047

[22] Filed: Jun. 3, 1981

Related U.S. Application Data

[63] Continuation-in-part of Ser. No. 115,460, Jan. 25, 1980, abandoned.

[51] Int. Cl.³ .............................................. G01V 1/38
[52] U.S. Cl. ........................................ 367/19; 367/76
[58] Field of Search ..................... 367/15, 16, 19, 20, 367/173, 76; 114/244, 245, 246; 324/330, 331; 340/857, 850

[56] References Cited

U.S. PATENT DOCUMENTS

| | | | |
|---|---|---|---|
| 2,610,240 | 9/1952 | Pottorf | 367/173 |
| 3,337,746 | 8/1967 | Georgi et al. | 340/857 |
| 3,833,880 | 9/1974 | Abbott | 367/173 |
| 4,068,208 | 1/1978 | Rice, Jr. et al. | 114/246 |
| 4,231,111 | 10/1980 | Norley | 367/19 |

Primary Examiner—T. H. Tubbesing
Assistant Examiner—K. R. Kaiser

[57] ABSTRACT

An apparatus for determining the azimuthal direction of a marine streamer cable at selected points along the cable. The apparatus comprises a pod that is clamped to the cable and contains a gimbaled magnetic compass and mean for establishing two-way communication between the pod and the cable.

8 Claims, 3 Drawing Figures

SEISMIC CABLE COMPASS SYSTEM

CROSS-REFERENCE TO RELATED APPLICATION

This application is a continuation-in-part of application Ser. No. 115,460 filed Jan. 25, 1980 now abandoned. The disclosure of that application is incorporated herein by cross-reference.

BACKGROUND OF THE INVENTION

The present invention relates to marine seismic exploration and particularly to marine exploration wherein a long seismic streamer is towed behind a survey vessel. In this system a source of seismic impulses is periodically activated to produce seismic waves that travel through the formations underlying the body of water and reflected from various interfaces back to the water where they are detected by the hydrophones placed in the seismic streamer. In recent years with the development of more sophisticated methods for processing seismic data, it has become desirable to know the precise location of the seismic streamer towed behind the survey vessel. These sophisticated methods include obtaining a large amount of data and then adding a large number of individual seismic signals to amplify the signals of interest while cancelling the noise or unwanted signals. For these techniques to be successful, it is necessary to know the precise position of the hydrophone in the seismic streamer at the time the seismic data was recorded.

U.S. Pat. No. 4,068,208 describes a system for determining the orientation of a seismic streamer using a single magnetic compass located midway along the length of the streamer which, along with various instrumentation placed on the survey vessel for determining the yaw, pitch and azimuth of the streamer. While the system provides accurate information regarding the portion of the streamer adjacent the survey vessel, it provides insufficient information regarding the remainder of the streamer. The seismic streamers presently used are two to three miles in length and thus subject to current and wave action. The current and wave action can cause a portion of the seismic streamer between the tow vessel and the end of the streamer to be displaced in a completely opposite direction from the original direction of the streamer adjacent to the survey vessel.

Also, gimbaled magnetic compasses on the market today that have a resolution accuracy suitable for this application are of a size too large to fit into the normal streamer sections. Thus, special, oversized streamer sections must be manufactured and inserted between normal, active sections of the streamer cable if compasses with high resolution are to be placed inside the streamer jacket. These oversized streamer sections inserted into the cable not only destroy the overall cable geometry, but also can add noise to the streamer because of the turbulence set up by the oversized sections being towed through the water. Both of these features are deemed undesirable for seismic data acquisition.

In addition to the above problems, the system described in the above patent is also extremely difficult to service. Since the compass is mounted in the oversized seismic streamer, it necessitates disassembly of the streamer to service any of the various components. Most seismic streamers are oil-filled to maintain buoyance and provide accurate response to the hydrophones to seismic waves, thus the oil must be drained and replaced when servicing the components.

BRIEF SUMMARY OF THE INVENTION

The present invention solves the above problems by providing a removable pod which may be clamped to the exterior of the seismic streamer and containing compass means for measuring the magnetic direction of the seismic streamer at the location of the pod. Two way electrical communication between the pod and the seismic streamer is accomplished by inductive coupling between the streamer and the pod. The pod is provided with a gimbaled magnetic compass which is mounted to rotate adjacent to and parallel with the longitudinal axis of the streamer. A battery pack is provided for powering the equipment while the compass signal is preferably converted to a telemetry signal which may be transmitted by the inductive coupling to the interior of the seismic streamer. Conductors in the seismic streamer in turn will transmit the signal to the survey vessel where it can be recorded. The pods being clamped to the exterior of the cable can be easily removed for servicing or positioning at desired locations along the streamer.

Knowing the aximuthal direction of the seismic streamer at various locations will provide information for determining the exact position of the streamer. The exact location of the seismic streamer can be obtained approximately by plotting as a series of straight lines the direction of the portion of the streamer between the various measurement locations. The plotting can be done graphically or by a properly programmed computer.

BRIEF DESCRIPTION OF THE DRAWINGS

The present invention will be more easily understood from the following detailed description when taken in conjunction with the attached drawings in which.

DESCRIPTION OF A PREFERRED EMBODIMENT

Figure 1:
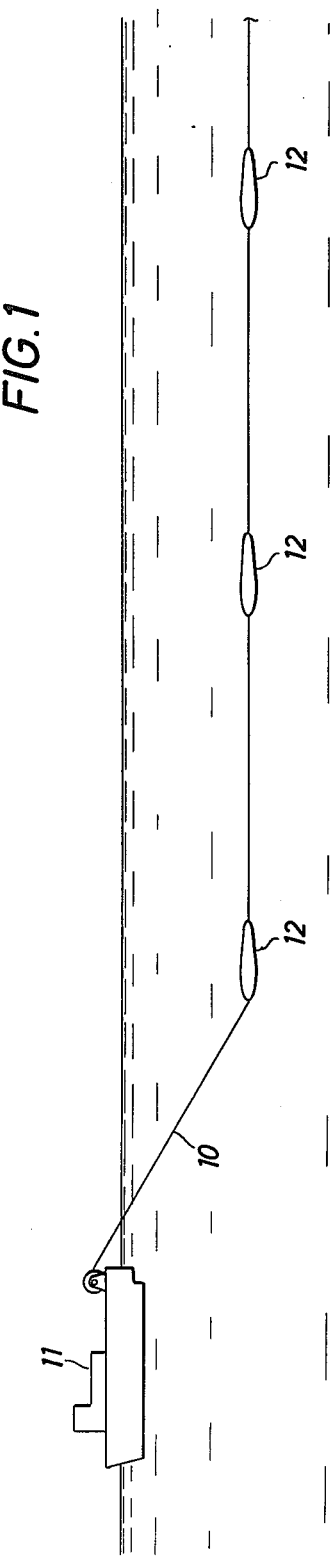
FIG. 1 is a view of a seismic vessel and marine streamer having pods attached thereto.

Referring now to FIG. 1, there is shown a marine seismic streamer 10 which is towed by the survey vessel 11. As is well known, the streamer 10 consists of a number of hydrophones spaced along the length of the streamer and coupled is series-parallel arrays. The arrays are connected to conductors in the stream which transmit the hydrophone signals to the survey vessel where they are recorded. In addition, the streamer is provided with suitable float means and depth control means so that it can be towed at the desired depth. Positioned along the length of the streamer are a series of pod members 12 which contain the direction measuring means of the present invention. The pods 12 are preferably formed in two halves which can be clamped to the outer surface of the streamer cable to form a single streamlined shape. The pods are constructed or molded from suitable high density plastic materials so that they have substantially neutral buoyancy and do not materially affect the depth at which the marine streamer is towed. The pods may be similar to those described in U.S. Pat. No. 3,375,800 except that they are modified to be clamped to the streamer in a fixed position.

Figure 2:
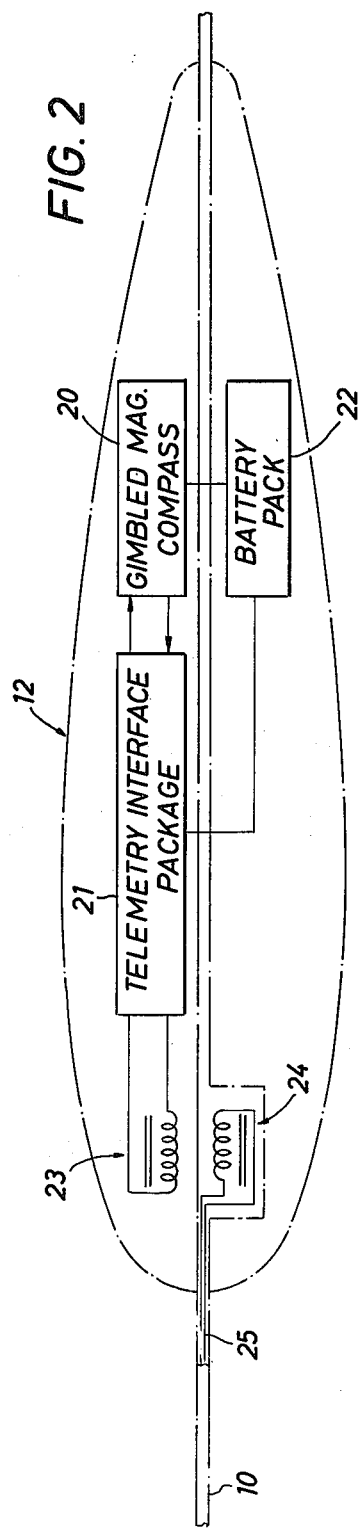
FIG. 2 is a cross section of one of the pods shown in FIG. 1.

Referring now to FIG. 2, there is shown a cross section of one of the pods shown in FIG. 1. The pod is provided with a gimbal magnetic compass 20; in particular, the magnetic compass should be gimbaled so that it rotates about the longitudinal axis of the marine streamer and accurately indicates the azimuthal direction of the streamer. In addition, the compass should be provided with suitable means which provide an electrical signal indicating the measured directions. A suitable compass is a Digicourse compass model 318 manufactured by the Digicourse Company of New Orleans, La. This compass has a resolution of 0.35 degrees and 10 bit binary code output. The signal may be either analog or digital. The signal is fed from the compass to a telemetry-interface package 21 that converts the compass data to a signal that is suitable for transmission to the survey vessel 11. The telemetry-interface converts the 10 bit binary compass signal to a frequency modulated signal that can be transmitted over the marine streamer. A battery pack 22 is provided for powering both the compass and the electronics in the pod. The signal from the telemetry-interface package is supplied to an inductive means 23. The inductive means may comprise a coil of wire wound on a soft iron core which is mounted within the pod adjacent the outer surface of the streamer. A similar inductive means 24 is mounted inside of the marine streamer adjacent the location of the inductive means 23. Since the inductive means 23 and 24 are relatively small, a large number of inductive means 24 may be placed within the marine streamer and thus provide a choice of locations for the pod members 12. The signal from the inductive means 24 is transmitted over a pair of leads 25 within the marine streamer 10 to the survey vessel 11. In addition to transmitting the azimuthal direction the pod 12 should also transmit a coded signal which indicates the location of the particular pod member along the marine streamer. The location of each pod can also be determined by assigning a separate pair of conductors in the marine streamer to each pod location. Both the measured direction and the location at which the measurement was made are recorded on the survey vessel.

It is normal practice in marine seismic surveys to record the time, location of the survey vessel and other background information before each shot. The term "shot" refers to the actuation of the seismic source and the recording of signals produced by the hydrophones in the marine streamer. The recorded information is used in processing the recorded signals to control various corrections, filtering and compositing of the data. The measured direction and location of the measurement can be recorded prior to each shot and used in processing of the recorded data.

Figure 3:
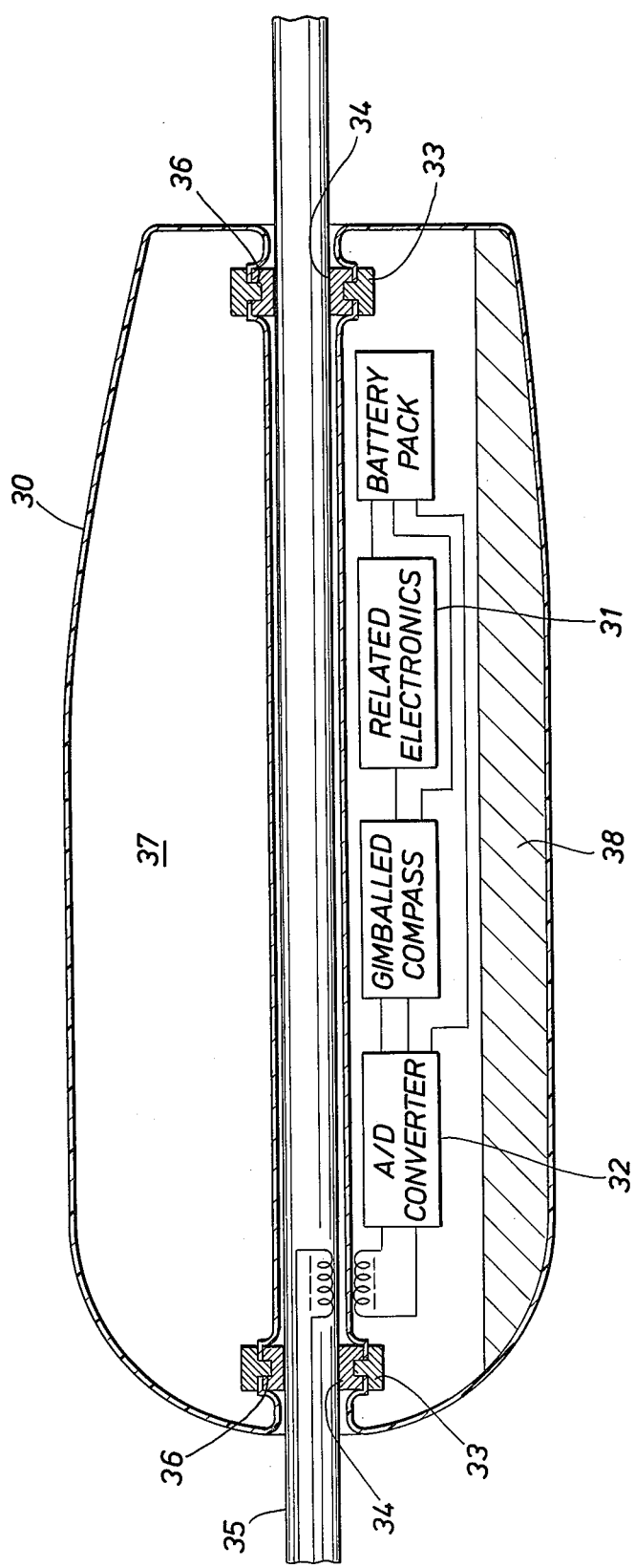
FIG. 3 is a cross section of a second embodiment of the pods shown in FIG. 1.

Referring to FIG. 3, there is shown a second embodiment of the pod member wherein the pod is adapted to rotate about the cable. The pod 30 is provided with substantially the same compass electronics package as shown in FIG. 2. The telemetry interface package 21 has been replaced by the compass electronics 31 and analog to digital converter 32. The pod is formed in two halves with bearings 33 at each end that mate with similar bearings 34 that are secured to the streamer cable 35. The bearings are formed of suitable plastic material such as nylon and are provided with grooves 36 that form axial thrust bearings. The bearings allow the pod to freely rotate about the streamer cable while maintaining it in a fixed axial position on the cable.

The pod is formed in two halves of a rigid lightweight material such as molded fiberglass or thin metal. The upper half of the pod contains flotation material such as foam 37 while the lower half is filled with ballast 38. This ensures that the pod will always assume the same orientation and provide a stable platform for the compass. The stable platform will permit the use of a lower cost compass such as a Digicourse Model 270 having a simpler gimbal system for modest angles of inclination.

From the description of a preferred embodiment, it is seen that the present invention provides a means for measuring the azimuthyl direction at selected locations along the marine streamer. The signal from each individual pod member is coded and it would be possible to reconstruct the exact location of any particular segment of the streamer in relation to the survey vessel 11. The position of the cable at any location can be determined by plotting a series of straight line segments using the compass headings and location measurements from the individual pods. This will permit one, when processing the seismic data, to correct the data for any displacement of the marine streamer from the course of the survey vessel. It is normally assumed that the marine streamer extends directly behind the vessel and thus all the data is corrected to this course. Once the data is corrected for the displacement of the marine streamer it can be combined with other data obtained along the survey line or with data obtained along adjacent survey lines. By combining the data, it is possible to emphasize the events of interest while minimizing or eliminating the noise in the seismic signals. Techniques for processing the seismic data and combining it are well known to those skilled in the art.

What is claimed is:

1. An apparatus for determining the position of a marine streamer cable towed behind a survey vessel, said apparatus comprising:
    a plurality of pod members, said pods being adapted to be clamped to the exterior surface of said marine streamer cable at spaced selected positions;
    a plurality of gimbaled magnetic compasses, one of said compasses being mounted in each of said pods to rotate parallel with the longitudinal axis of the cable;
    telemetry means disposed in each of said pods and coupled to said compass, said telemetry means producing a signal representing the heading of said compass; and,
    inductive means, said inductive means comprising a first inductive coil disposed in each of said pods and a second inductive coil disposed in said cable adjacent said first inductive coil, said first inductive coil being coupled to said telemetry means and said second inductive coil being disposed in said cable and coupled to a pair of conductors in said cable.

2. The apparatus of claim 1, wherein the position of said compass is converted to a signal suitable for transmission through the streamer jacket by inductive means using a telemetry-interface package disposed in said each of said pods; said compass being coupled to said package and said package being coupled to said communication means.

3. The apparatus of claim 1 wherein each second inductive coil in said marine streamer is coupled to a separate pair of conductors in said marine streamer cable.

4. An apparatus for determining the position of a marine streamer cable towed behind a survey vessel, said apparatus comprising:
- a plurality of pod members, said pod members being secured to the exterior of said marine streamer cable at spaced preselected positions;
- a plurality of gimbaled magnetic compasses, one of said compasses being mounted in each of said pods to sense the magnetic heading of a line tangent to the longitudinal axis of the streamer cable;
- telemetry means disposed in each of said pods and coupled to said compass, said telemetry means producing a signal representing said magnetic heading; and,
- inductive means, said inductive means comprising a first inductive coil disposed in each of said pods and a second inductive coil disposed in said marine streamer cable opposite said first inductive coil, said first inductive coil being coupled to said telemetry means and said second inductive coil being coupled to a pair of conductors in said cable.

5. The apparatus of claim 4 wherein said pods are free to rotate about said marine streamer cable.

6. The apparatus of claim 5 wherein each of said pods are provided with bearings, one portion of said bearing being disposed in said pod and the other portion being fixed to said marine streamer cable at said preselected positions whereby said pods are maintained at said preselected positions.

7. The apparatus of claim 4 wherein each of said pods is formed in two halves that are adapted to be fastened together to form a unitary structure attached to said marine streamer cable.

8. The apparatus of claim 7 wherein one half of the pod is provided with flotation and the other half is ballasted.

* * * * *